United States Patent
Marman et al.

(10) Patent No.: US 9,584,710 B2
(45) Date of Patent: Feb. 28, 2017

(54) INTELLIGENT HIGH RESOLUTION VIDEO SYSTEM

(75) Inventors: Douglas H. Marman, Ridgefield, WA (US); Mahesh Saptharishi, Waltham, MA (US)

(73) Assignee: AVIGILON ANALYTICS CORPORATION, Vancouver (CA)

( * ) Notice: Subject to any disclaimer, the term of this patent is extended or adjusted under 35 U.S.C. 154(b) by 1685 days.

(21) Appl. No.: 12/039,085

(22) Filed: Feb. 28, 2008

(65) Prior Publication Data

US 2009/0219387 A1 Sep. 3, 2009

(51) Int. Cl.
| | |
|---|---|
| H04N 9/47 | (2006.01) |
| H04N 5/232 | (2006.01) |
| G08B 13/196 | (2006.01) |
| H04N 5/235 | (2006.01) |
| H04N 5/355 | (2011.01) |

(52) U.S. Cl.
CPC ....... *H04N 5/232* (2013.01); *G08B 13/19652* (2013.01); *H04N 5/235* (2013.01); *H04N 5/2355* (2013.01); *H04N 5/23232* (2013.01); *H04N 5/23238* (2013.01); *H04N 5/35527* (2013.01)

(58) Field of Classification Search
CPC .. H04N 5/232; H04N 5/23238; H04N 5/2355; H04N 5/235; H04N 5/35527; H04N 5/23232; G08B 13/19652
USPC .......................................................... 348/143
See application file for complete search history.

(56) References Cited

U.S. PATENT DOCUMENTS

| | | | |
|---|---|---|---|
| 6,445,741 B1 * | 9/2002 | Bellers et al. ........... | 375/240.16 |
| 7,450,165 B2 * | 11/2008 | Ahiska ...................... | 348/240.2 |
| 7,773,121 B1 * | 8/2010 | Huntsberger et al. ..... | 348/218.1 |
| 2004/0227829 A1 * | 11/2004 | Wixson et al. ............ | 348/294 |
| 2005/0275747 A1 * | 12/2005 | Nayar et al. .............. | 348/362 |
| 2008/0129844 A1 * | 6/2008 | Cusack et al. ............ | 348/241 |
| 2008/0288888 A1 * | 11/2008 | Kahle et al. .............. | 715/781 |
| 2012/0038776 A1 | 2/2012 | Ahiska et al. | |

OTHER PUBLICATIONS

U.S. Appl. No. 13/781,240; Office Action; dated Jun. 11, 2015; 13 pages.

\* cited by examiner

*Primary Examiner* — Viet Vu
*Assistant Examiner* — Herman Belcher
(74) *Attorney, Agent, or Firm* — Baker & Hostetler LLP

(57) ABSTRACT

An automated electronic video surveillance system enables a high-resolution mega-pixel camera to capture high quality, detailed, magnified images at multiple locations, simultaneously with an overview of the whole scene. A preferred embodiment requiring no moving parts provides full 360-degree continuous viewing with up to 5× all-digital zoom capability. The system performs continuous surveillance and active resolution allocation in the form of a feedback control subsystem that dynamically allocates resources so that important details within a scene receive appropriate scrutiny, while uninteresting areas are imaged at a lower resolution.

31 Claims, 14 Drawing Sheets

1/4 sub-sampling

INTELLIGENT HIGH RESOLUTION VIDEO SYSTEM

COPYRIGHT NOTICE

©2008 VideoIQ, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The present disclosure relates to video analytics and video signal processing for use in advanced video surveillance systems.

BACKGROUND INFORMATION

There is growing interest in using high resolution digital cameras or "mega-pixel imagers" in security and surveillance systems. Greater resolution improves accuracy in identifying people and objects and offers digital zoom for more detail. However, there is a practical limit to the volume of video data that can be transmitted from an imager chip, thus limiting access to video details and constraining mega-pixel cameras from delivering their true potential, i.e., all the video data they can capture. For example the AV-3100, which is sold and manufactured byArecont Vision of Altadena, Calif., is one of the fastest 3 mega-pixel cameras currently on the market, but the AV-3100 cannot operate at its full video transfer rate of 30 frames per second. Standard security surveillance cameras deliver images of about 0.4 mega-pixel resolution at a rate of about 30 frames per second. Even 2 mega-pixel resolution at 22 frames per second requires more than a 40 megabytes per second (Mbps) data transmission rate from an imager chip. Most users have difficulty processing streams of data at 40 Mbps. New communications and storage systems lack the bandwidth to handle data rates 5 to 10 times faster than previous generation data rates. When faster speeds become possible, surveillance systems become prohibitively expensive.

One technique for managing large volumes of data entails transferring from the imager chip a portion (e.g., one-eighth of the number of pixels or a VGA quantity of pixels) of the video information to a central location for analysis. This approach carries risk of loss upon transfer of important video data that would represent an event or behavior of interest but post-transfer analysis would not detect. To overcome bandwidth limitations, some companies such as Arecont Vision or CoVi Technologies post-process video information from an imager chip to compress the volume of data transmitted to the rest of a surveillance system. Some modern data compression schemes that conform to industry standards, such as MPEG-1, MPEG-2, and H.263, offer only content-agnostic, lossy data compression. Although most new compression standards (e.g., MPEG-4 and MPEG-4 AVC) allow for object level prioritization of bandwidth allocation and multiple alternatives for scalability (in the case of MPEG-4 SVC), they fail to consider the relative importance of the video content, i.e., different areas within a field of view, such as an area containing human figures v. an area containing a moving tree branch.

While traditional data compression schemes treat all bits of data as though they were of equal value, there is need for an intelligent spatial and temporal resolution allocation mechanism that selectively assigns value to spatio-temporal portions of video content. The resolution allocation mechanism should automatically assign a high value if the data contain relevant and useful subjects within a scene, or a low value if the data contain subjects that provide no useful information. There are currently some tools available for use in intelligently allocating spatio-temporal resolution. For instance, one such value assessment tool offered by video analytics manufacturers is capable of detecting the presence of human beings, vehicles, license plates, and other items of interest.

SUMMARY OF THE DISCLOSURE

A smart, automated active video surveillance system enables a camera equipped with a high-resolution mega-pixel imager to selectively zoom into a scene and perform a windowing process that entails capturing high quality, high resolution images simultaneously at multiple locations, without losing the overview of the whole scene, while processing only the fraction of the video data representing one or more locations where important action is taking place. A preferred embodiment is a system that provides with no moving parts full 360-degree panoramic viewing with 2× all-digital zoom capability. Another preferred embodiment implements a system with a narrower fixed focal length with over 20× the number of pixels of a standard D1 resolution camera to provide about 5× all-digital zoom. The system carries out a method that allows for continuous video surveillance and thereby improves upon cameras that are limited to either focusing at close range or viewing an entire scene. The system overcomes such a limitation, which otherwise would entail making a choice that could allow important events to elude detection. The video surveillance system is implemented with a control subsystem that dynamically allocates resolution so that important details within a scene receive appropriate scrutiny while uninteresting areas are imaged at a lower resolution.

A preferred system disclosed therefore entails first achieving high-resolution image capture capability, and then deploying that capability selectively and efficiently. Obtaining high resolution, high quality video images is accomplished by choosing optimal camera lenses, and combining the lenses with technology that maximizes light sensitivity and signal-to-noise ratios of digital light sensors in the imager. The resolution is then intelligently allocated by careful selection of subject matter within the field of view of the camera using a combination of preset user inputs, real-time image analysis, and feedback-controlled automatic sub-sampling.

Video analysis is performed on-board the video surveillance camera so as to avoid transmission of a complete frame of high-resolution megapixel video data from the imager through a communication medium for storage or processing. This is accomplished, not by merely re-formatting the video data or through bulk data compression, but instead by using pattern recognition techniques to perform judicious sub-sampling of the full image frame. A non-uniformly sampled frame of video can be constructed with higher spatial and temporal resolution allocated to portions of the image with important content. This sampling scheme allows construction of super-resolution video from standard resolution data and display of the resulting images, using MPEG-4 techniques compliant with existing standards.

The system can provide multiple, interleaved windows, with video analytics performed in parallel on all windows so that multiple cameras can be replaced with one camera. In general, an object's distance from the camera, size, and speed determine the spatial and temporal resolution necessary in any given part of the video image. For instance, for security and surveillance applications, the texture of the sky or the shapes of clouds are not so important as a readable license plate; the video analysis techniques described are capable of distinguishing the license plate from the sky when it comes to allocating imaging resolution.

This method serves to reduce, by at least a factor of about ten, the original volume of data to a more meaningful and more manageable data subset of the full frame of video data. The data subset includes carefully selected portions of the overall scene, which the imager is then directed to release for storage in a buffer memory. The data subset, formed by immediately sub-sampling the original volume of data residing within the imager, can be chosen in many different ways. One way is to choose, for example, every fourth, tenth, or n-th pixel, resulting in a uniformly sub-sampled low resolution image. Another way is to pre-define certain windows within the overall scene, sample those at high or low resolution, and ignore the rest of the data. A third way is a two-step process in which a uniformly sub-sampled low resolution image is analyzed and then further segmented by identifying areas of interest to be captured at high resolution. A magnified view can then be constructed from the resulting sub-sampled image, and the process may be repeated by a second stage of analysis if needed. If further image detail is desired for the selected portions of the image, the original high resolution data corresponding to those selected portions, can be retrieved and stored in the buffer memory for analysis. Regardless of the method of sub-sampling, the camera transmits to a network or other communication medium video data representing a smaller portion than the capacity of the imager and thereby reflecting the relative importance of the video content. Transmitting and storing a judiciously chosen data subset rather than the entire data set is what allows for the superior efficiency of the disclosed method.

Another preferred embodiment uses a high resolution mega-pixel imager to combine iris scanning and facial recognition. In this embodiment, the portion of an image that includes, for example, a face is visible with sufficiently fine resolution to perform accurate facial recognition analysis. At the same time, the camera can show even higher resolution of an eye to execute biometrics matching of the iris. It is also possible to magnify details of other distinctive facial features to add further recognition capability. All of these functions can be provided with a camera that has a wide field of view and no moving parts.

Additional aspects and advantages will be apparent from the following detailed description of preferred embodiments, which proceeds with reference to the accompanying drawings.

BRIEF DESCRIPTION OF THE DRAWINGS

FIG. 5 also presents, in the lower right-hand corner, an enlarged image of the window scene in which the best details of each of the four images are combined to produce a wide dynamic range image.

DETAILED DESCRIPTION OF PREFERRED EMBODIMENTS

System Overview

Figure 1:
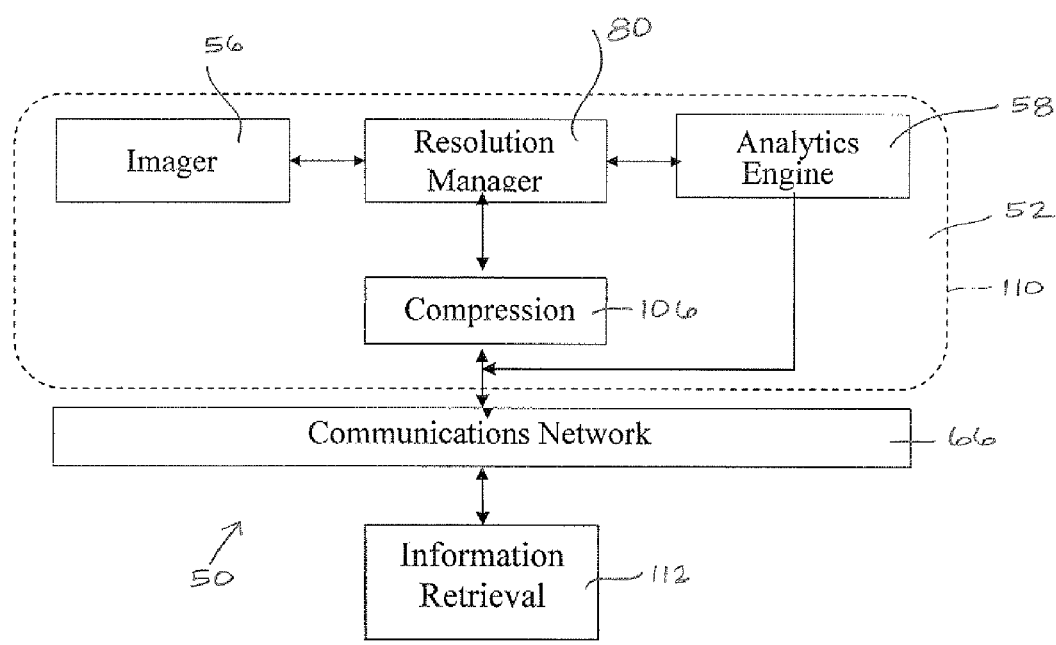
FIG. 1 is a block diagram showing the major components of a preferred embodiment of the active video surveillance system disclosed.
Figure 2:
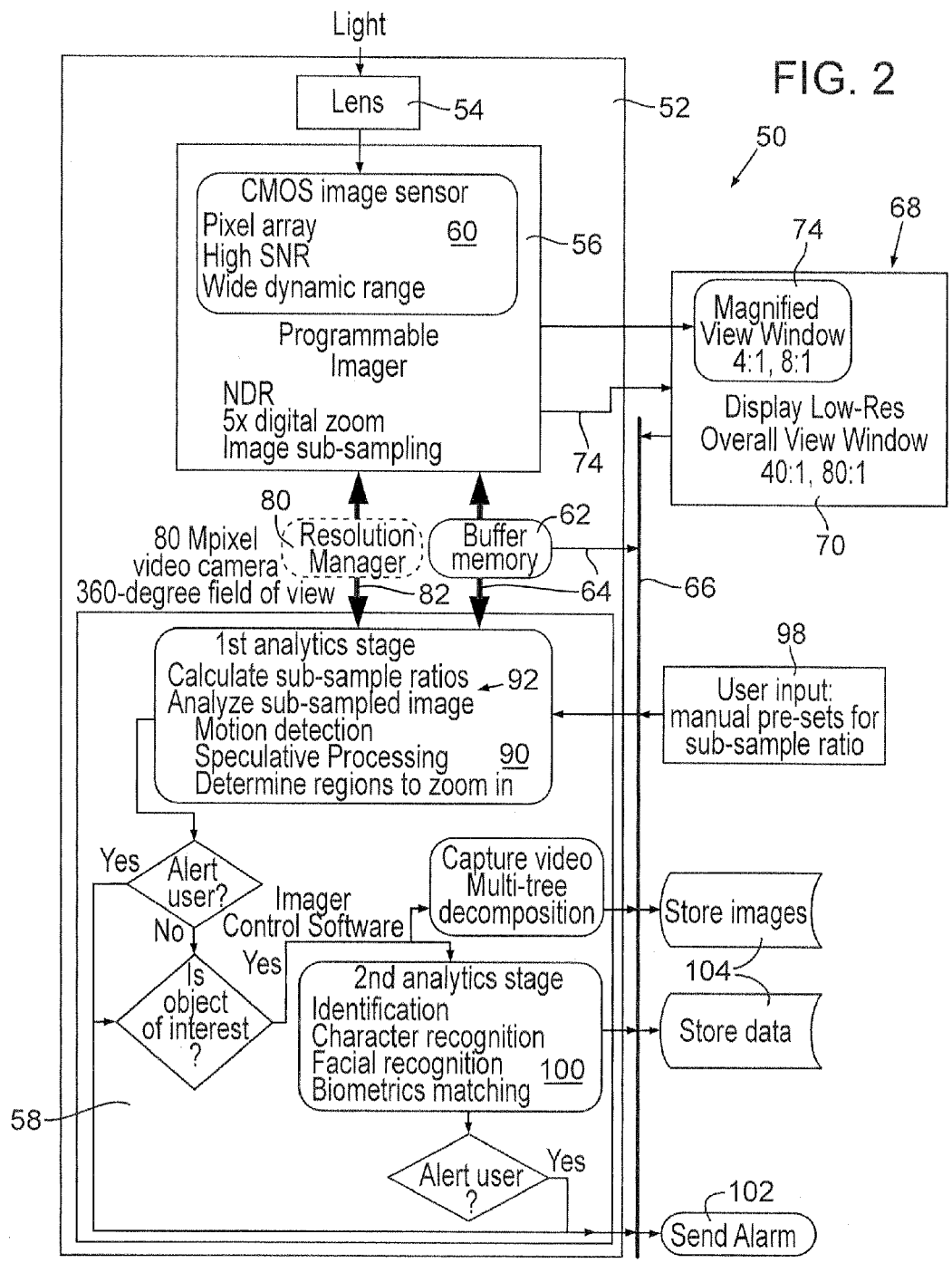
FIG. 2 is a flowchart indicating the functions performed within each component of the block diagram of FIG. 1.

FIG. 1 is a simplified block diagram of the major components of an active video surveillance system 50, and FIG. 2 is a flowchart of the overall system operation. With reference to FIGS. 1 and 2, a preferred embodiment of system 50 is implemented to allocate image resolution provided by one or more high image data capacity video cameras 52. The system design of a preferred embodiment accommodates the use of one or more light-sensitive fixed focal length lenses 54. A fixed focal length, low f-stop lens 54 improves the low-light performance of a high resolution mega-pixel programmable imager 56 implemented with an advanced pixel architecture and, when combined with the capability of a two-stage video analytics engine 58, contributes to performance of interest-level based sub-sampling of acquired images. Video analytics engine 58 is implemented in software.

Figure 3:
FIG. 3 is a video image display screen capture of a video surveillance system showing, in an upper window, a 360-degree view of a parking lot, and in two lower windows, high resolution, magnified views of different specific regions of interest appearing in the upper window.

Each high image data capacity video camera 52 comprises a programmable integrated circuit imager 56 that includes image sensors 60 and has digital zoom capability and a buffer memory 62 that stores frames of image data acquired by imager 56. The storage capacity of buffer memory 62 is sufficient to store multiple frames of image data acquired by imager 56. At least three frames of image data storage capacity are preferred to store image data representing times before, during, and after an event of interest has occurred. An output 64 of buffer memory 62 is applied to video analytics engine 58 and through a communications medium or network 66 to a display 68. FIG. 3 shows, as an example, display 68 presenting an unmagnified view window 70 containing a 360-degree panoramic view 72 of a scene, together with two magnified view windows 74. Magnified view windows 74 contain adjacent to unmagnified view window 70 different view portions 76 and 78 of panoramic view 72. Skilled persons will appreciate that provision of two or more magnified view windows 74 simultaneously located either adjacent to or in overlapping relationship with unmagnified view window 70, or in another arrangement, is possible.

A user may manually define areas of an overall scene for monitoring, increased resolution, and video analytics processing. For instance, in a scene monitored by a security camera inside a bank, one video camera 52, instead of four separate cameras, may be used to monitor four teller windows. Each teller window may be pre-designated as a region of interest, either manually, or by a self-learning algorithm that detects motion over a period of time. Video analytics engine 58 then processes concurrently all four of the windowed areas as though they were images acquired by four separate low-resolution cameras. Imager 56 may be instructed to provide sequentially at an output a windowed frame of each defined region of interest. Thereafter, the frames from each of the multiple images are interleaved and sent from imager 56. The above-described process is repeated, starting with the first teller window region of interest. Video data sent from imager 56 are then processed to recognize activity in each of the windows.

A software-implemented resolution manager 80 instructs by way of a feedback control path 82 a transfer from imager 56 to buffer memory 62 of data representing a raw image corresponding to unmagnified panoramic view 72. Imager 56 has a specified maximum number of image pixels that establish its characteristic maximum image resolution. These raw image data provided at output 64 of buffer memory 62 are accessible by a first analytics engine stage 90 of video analytics engine 58. First analytics engine stage 90 detects a level of interest and calculates sub-sample ratios 92 for different portions of the raw image in response to the level of interest detected. Resolution manager 80, by way of control path 82, controls imager 56 to acquire a first series of sub-sampled video data corresponding to a first field of view at a first image resolution, such as unmagnified panoramic view 72, of video camera 52. Imager 56 delivers the sub-sampled video data in the first series to buffer memory 62 for analysis by first analytics engine stage 90. First analytics engine stage 90 detects a region of interest in the scene, such as motion of an object warranting further investigation. First analytics engine stage 90 in response assigns to a location exhibiting motion a low sub-sample ratio, which corresponds to a high-magnification image. Having detected an object of interest within a field of view, first analytics engine stage 90 sends to resolution manager 80 approximate x- and y-coordinates specifying the location of the object in the scene acquired by imager 56 of video camera 52. Resolution manager 80, by way of control path 82, controls imager 56 to acquire a second series of sub-sampled video data corresponding to a second field of view of the scene at a second image resolution. Imager 56 delivers the sub-sampled video data in the second series to buffer memory 62. The sub-sampled video data in the second series represents, at the second image resolution, a windowed view of the detected region of interest in the first field of view of the scene. The windowed view can be, for example, magnified view window 74 representing a zoomed-in image portion of unmagnified panoramic view 72. Each of the first and second series of sub-sampled video data corresponds to fewer image pixels than the specified maximum number of image pixels of imager 56. The zoomed-in portion of the image data can be read out of buffer memory 62 on its output 64 for delivery through communications network 66 to display 68 for presentation in magnified view window 74, for example, as view portion 76. The specified portion of the scene shown in view window 70 generally changes dynamically frame-by-frame, i.e., over different series of sub-sampled video data, as the object of interest moves across the scene. First analytics engine stage 90 accordingly continually adjusts in real time the x- and y-coordinates of the location of the object in the scene. Alternatively, a user can manually pre-set a priori sub-sample ratios 98 for various locations if they are in regions of particular interest known in advance (e.g., building entrances and exits).

If the windowed view is determined to be of further interest, a second analytics engine stage 100 may be activated to perform such analysis functions as character recognition, biometrics matching, human or vehicle identification, video capture, or alarm signal 102 transmission to a user. Resolution manager 80 uses results obtained by first analytics engine stage 90 from the second series of sub-sampled video data to again control imager 56, by way of control path 82, acquire a third series of sub-sampled video data corresponding to a third field of view of the scene at a third image resolution, such as a more highly magnified zoomed-in image portion for closer detailed analysis. Second analytics engine stage 100 speculatively allocates resolution for communication and storage. Second analytics engine stage 100 may deliver images through communications network 66 for presentation on display 68 or for storage in a storage medium or an information storage database 104 containing relevant information and space to store, for later communication, images and data relating to image content A data compression subsystem 106 may be used to compress the image data before they are delivered to communications network 66 for storage or display.

The above-described process carried out by two-stage video analytics engine 58 on selected portions of image data acquired by imager 56 constitutes judicious sub-sampling of the full image observed by video camera 52 and pattern recognition analysis of the sub-sampled portions acquired. Image data representing or data corresponding to the image content of magnified views 76 and 78 constructed from the sub-sampled image of panoramic view 72 are delivered for display or storage through communications network 66 without transfer of all or a bulk-data compressed representation of all of the full image observed by video camera 52.

The transfer to communications network 66 of the acquired image portion is accomplished at nominal video transmission rates with the image detail resolution specified for the particular application.

Components enclosed in a dash-line box 110 shown in FIG. 1 may all be located within the housing of video camera 52. These include programmable imager 56, resolution manager 80, two-stage video analytics engine 58, data compression subsystem 106, and information storage database 104. Components located outside dash-line box 110 include display 68 and an information retrieval module 112, which would normally reside at a remote command center. An alternative embodiment includes the same components, but some of them, such as two-stage video analytics engine 58 or information storage database 104, may reside outside the housing of video camera 52. Hardware in which first video analytics engine stage 90 is implemented may also be divided so that more computationally intensive processors perform certain operations outside the housing of video camera 52, while other sub-components remain within the housing of video camera 52.

With respect to video camera 52, if pan, tilt, and zoom (PTZ) capabilities are required for 360-degree viewing, two embodiments compatible with the system disclosed are possible. First, because fine control during close-up shots is accomplished through the use of digital zoom, video camera 52 can be mounted on a simple, coarse stepping, low-cost pan and tilt mechanism implemented with simple DC drive motors without the need for fine pitch, highly accurate, encoded servo motors that require sophisticated controls to smooth the movements. Second, with a sufficiently large resolution programmable mega-pixel imager 56 (about 80 mega-pixels) and the use of 360 degree optics, this embodiment enables with no moving parts a full 360 degree imager with about 5× digital zoom in any direction, as opposed to the 2× digital zoom provided by an 8 mega-pixel imager. Once again, this embodiment does not lose the full field of view while zooming in and simultaneously provides close-up views of multiple locations in the full field of view.

Sensor Dynamic Range

Figure 4:
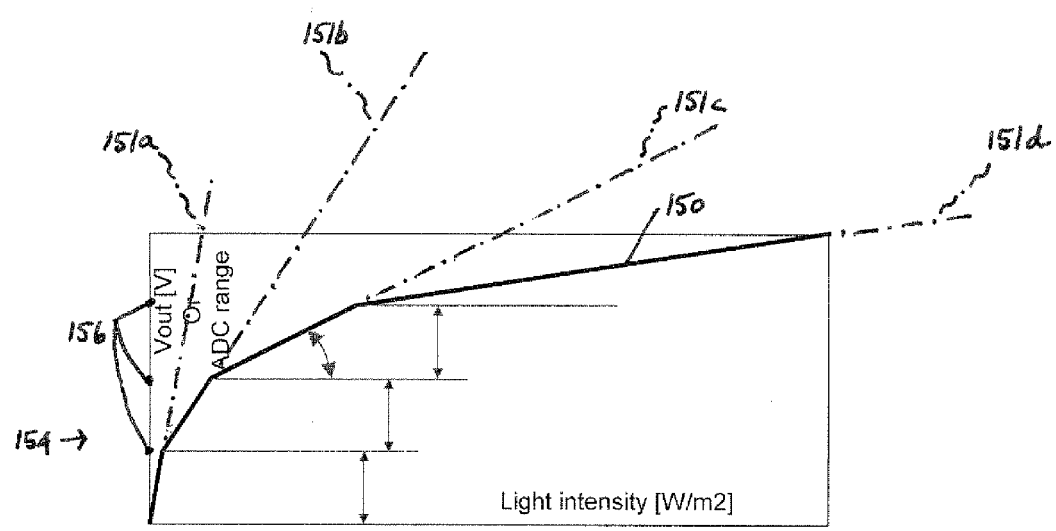
FIG. 4 is a graph relating pixel voltage to pixel light intensity and showing a four-slope power-voltage relationship, in which each slope corresponds to a different rate of photon capture.

Image sensors 60 within programmable imager 56 feature a pixel design that provides a high signal-to-noise ratio (SNR) useful for imaging in low-light situations, and a wide dynamic range to handle variable light or high-contrast areas within a scene. A wide dynamic range allows for accurate data retention in the darkest and brightest parts of an image. A preferred method of achieving a wide dynamic range is implemented in a Fill Factory 4T4S pixel design available from Cypress Semiconductor of San Jose, Calif. Each pixel comprising an image is associated with a hardware image sensor 60 that captures photons at an adjustable rate. With reference to FIG. 4, a quadratic power-voltage relationship characterizing image sensor 60 can be approximated by a four-slope, piece-wise linear curve 150, where the four slopes 151a, 151b, 151c, and 151d of portions of curve 150 are related to photon capture rates and associated pixel capacitance levels. A method of multiple slope integration is used to map a wide optical light intensity range 152 onto a compressed voltage output range 154 by specifying relative slopes and adjusting inflection point voltage values 156 (voltages at which the slopes change) that are, in general, programmable, although they may be fixed in certain image sensors 60.

While a multiple slope integration approach can significantly improve dynamic range, it can also introduce artifacts that become problematic for analytics engines. For instance, when the intensity of a portion of an image is very close to an inflection point voltage at which a pixel changes its capacitance photon capture rate, as the image becomes slightly brighter or dimmer, it will undergo color distortion. Distortion can be eliminated by correcting pixel data based on an ideal smooth curve. Either a formula or a look-up table can be used to calculate a correction factor applied to each pixel read-out. More correction is needed when pixel data are close to the threshold of inflection-point voltages 156 where capacitance levels change. When they are approximately half way between inflection point voltages 156, the pixel data need the least amount of correction. Applying the correction factor amounts to a simple addition function and is, therefore, not computationally intensive. A dual slope design with only one inflection point needs more correction, especially near the single inflection point.

An alternative approach to achieving wide dynamic range is a pixel capture technique known as Synchronous Shutter or Global Snapshot, also available from Cyprus Semiconductor of San Jose, Calif. This approach captures data from all pixels simultaneously, and reads out the data sequentially, requiring extra transistors in each pixel or pixel group for data storage from capture until read out. With this method, it is possible to read out the pixel data more than once during a frame period. This is known as Non-Destructive Read-out (NDR), because the pixel continues to gather photons for a full frame period, while reading out the data multiple times during that period.

Figure 5:
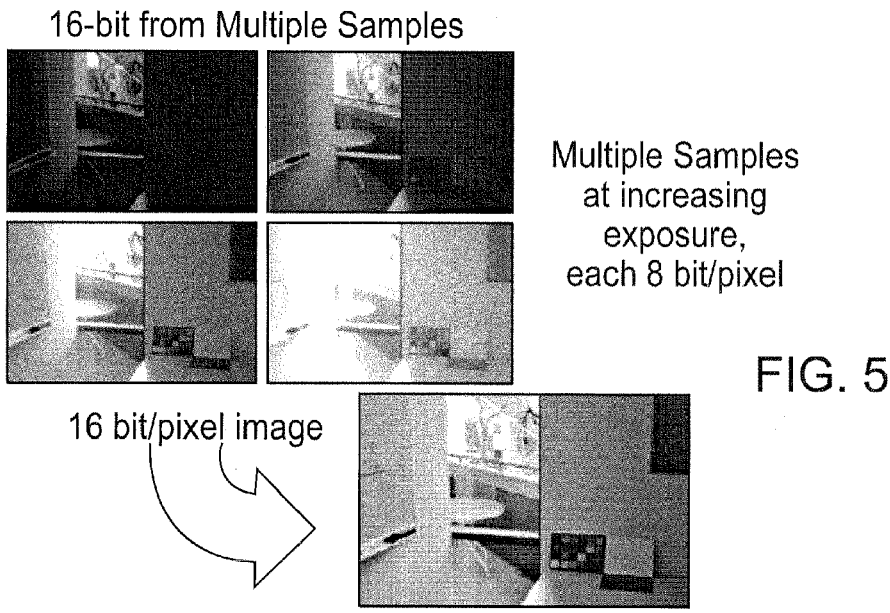
FIG. 5 presents a set of video images supplied by Pixim, Inc. of Mountain View, Calif., showing in a four-square pattern, for four different levels of progressively increasing exposures, a window scene with increasing brightness resulting from varying light levels.

Data from multiple read-outs can be used to re-create a single frame with a wider dynamic range. In effect, each read-out time corresponds to an inflection point in the above illustration, but in the time domain rather than in the voltage domain. Such a multiple read-out approach is superior because the data can also be used to improve the SNR. Since multiple read-outs of light intensity are taken during a single frame, these data can be averaged into a single light intensity measurement. This averaging process reduces most types of noise present in the measurement. FIG. 5 shows a series of four NDR pictures 160, 161, 162, and 163 that, when merged into a single picture 164, exhibits a wider dynamic range and a higher SNR than any single image provided by the same imager.

The ability to make Non-Destructive Read-outs provides an added benefit when combined with system 50 because NDRs optimize the dynamic range for windowed regions of interest. In a typical security and surveillance application, a scene 70 contains mostly background information. The background may be highly dynamic, but it usually does not contain the most critical information. Rather, objects in the foreground are typically of most interest. These can be people, vehicles entering or leaving the field of view, or objects moved or left behind. It is these regions of interest where most of the critical information is contained; therefore, there is benefit in optimizing the capture of these pixel data.

Figure 6:
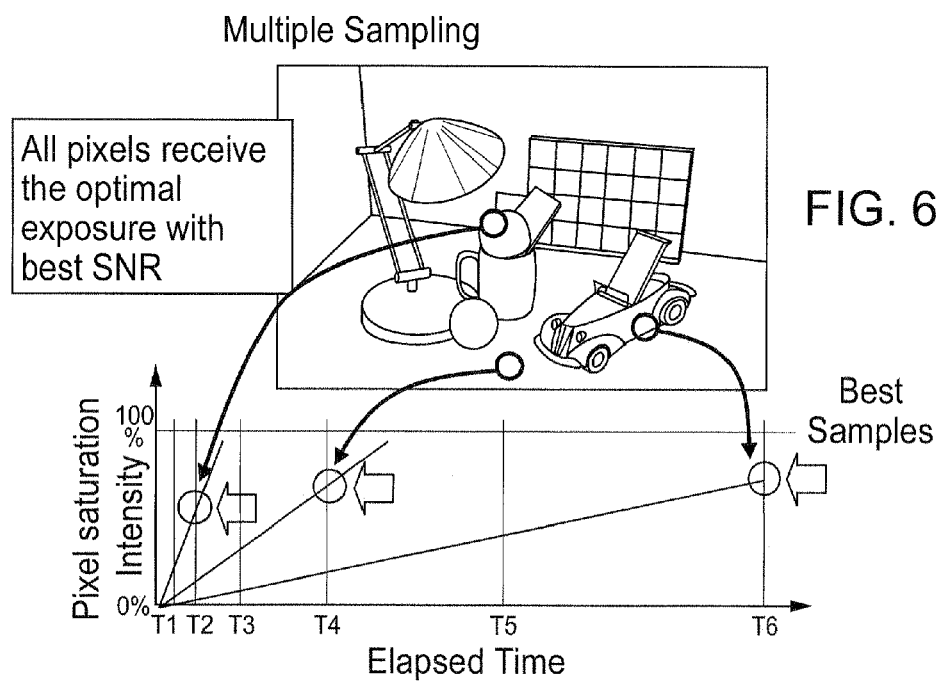
FIG. 6 is a combination photograph and pixel saturation v. elapsed time plot supplied by Pixim, Inc. of Mountain View, Calif., showing a collection of objects that reflect a wide range of light intensities and exhibit, therefore, different times of pixel saturation that complicate a choice of exposure time for the video imager. The individual pixels of the image shown have been optimized for exposure level to provide a greater dynamic range image.

It is not uncommon for parts of a scene to be obscured as a result of pixel saturation. For example, with reference to FIG. 5, if the iris setting on a lens of an indoor surveillance camera focused on a window 166 is optimized for subjects inside the building, then a bright daylight scene 163 through the window may be overexposed and appear washed out. The graph in FIG. 6 shows that the optimal exposure time varies significantly depending on the brightness or darkness of the objects. Shiny objects 168 or light colored objects 170 can be successfully imaged in a shorter exposure time T2, whereas dark objects 172 require a longer exposure time T6. NDR, combined with the system 50 disclosed, enables selection of the best capture time for the windowed regions of interest. Multiple readouts allow either a wider dynamic range, in the case of brighter light areas, or elimination of sensor noise through averaging the readouts, in the case of lower light areas. This is accomplished by applying simple analytics to determine the brightness of objects or regions of interest. By intelligently zooming in on the area of interest, the dynamic range of the imager is effectively improved, because regions of extreme contrast (i.e., the brighter and darker areas) are removed from the image. If imager 56 allows variable exposure control, the analytics information may then be used to calculate and actively adjust exposure levels to optimize capture times for best object recognition and best quality images.

When important areas in a scene are captured with intelligently managed timing, then it is also possible to intelligently optimize video frame rates. For example, if regions of interest contain poorly lit areas, then extended frame durations or integration times can be selected to improve SNR for those darker regions. Or, if regions of interest contain very bright areas, then NDR can be used to provide a wider dynamic range in the brighter regions. More specifically, when video analytics engine 58 analyzes sub-sampled video data in the first series of sub-sampled video data to recognize an object in an area of the region of interest, resolution manager 80 controls imager 56 to acquire one of the first and second series of sub-sampled video data at a frame rate set in response to the brightness levels of the object and the area. The frame rate is set to provide a frame integration time that is adequate to provide a brightness level contrast between the object and the area to render them visually distinguishable from each other. Resolution manager 80 can also control imager 56 to acquire the first and second series of sub-sampled video data at, respectively, different first and second frame rates.

Dynamic range adjustment can save the computational cost of providing wide dynamic range to a whole scene, when only portions of the scene are important. In this case, regions of interest can be assured of the necessary dynamic range needed for viewing, while ignoring the computational efforts to expand or correct the dynamic range of regions that have no value. When combined with analytics as disclosed, this process of dynamic range adjustment can be handled intelligently in response to objects or areas of interest. For these reasons, even though the disclosed embodiments can work with any approach to dynamic range, a preferred approach is through NDR, in which analytics can provide feedback to intelligently activate or deactivate NDR, or to adjust and optimize the dynamic range where needed.

Image Quality

Currently available, inexpensive high resolution programmable imagers 56 are mainly used in cell phones and other low cost, high volume consumer applications. For example, an 8 mega-pixel imager (model MT9E001, available from Micron Technology, Inc. of Boise, Id.) consumes only about 50% more real estate on a CMOS silicon chip than a traditional 0.4 mega-pixel imager (model D1, available from Pixim, Inc. of Mountain view, Calif.). The increase in resolution is accomplished using much smaller pixels, each measuring 1.75×1.75 square microns compared with 6×6 square microns for the model D1 imager, so that the total pixel area is approximately 12 times smaller. A pixel with $\frac{1}{12}$ the area can capture only $\frac{1}{12}$ the number of photons; therefore, a video camera 52 containing an 8 mega-pixel programmable imager 56 would offer poor performance in low light conditions. This might be adequate for a typical cell phone camera, or even a typical consumer camera, but it is inadequate for most security and surveillance needs. Therefore, chips like the MT9E001 have not been used in professional security cameras.

Outdoor security applications, in which mega-pixel imagers would be most valuable, require roughly the same light sensitivity as does the traditional model D1 imager, which, for good image recognition, is less than 1 lux of light through a 1.2 f-stop lens. With improved low noise operation and higher SNR, the MT9E001 gains about a factor of two in light sensitivity, not a factor of 12. Furthermore, imagers used in most zoom cameras are typically ¼-inch (6.4-millimeter) format chips (measured diagonally), compared to the ⅓-inch (8.5-millimeter) format chips for traditional cameras with fixed focal length lenses. The smaller format makes it easier to design a good compact zoom lens. However, the smaller chip size also reduces light sensitivity by about 78%. The smaller format combined with the reduced pixel size leaves somewhere between a 3× and 6× difference in light sensitivity between the MT9E001 imager and a ¼-inch (6.4-millimeter) model D1 imager used in a typical zoom camera.

One way to offset reduced light sensitivity is to combine a high resolution programmable imager with a pixel architecture such as the 4T4S architecture previously mentioned, which combines and averages light energy gathered across groups of four pixels. This effectively turns an 8 mega-pixel imager into a 2 mega-pixel imager with an improvement of roughly 4× in light sensitivity, thus reducing the gap in light sensitivity from $\frac{1}{12}$ to only $\frac{1}{3}$.

Another way to address the problem of reduced light sensitivity is through the use of specialized optics. Traditional security cameras use fixed focal length lenses with f-stops in the 1.0-1.8 range, with 1.4 being typical. Zoom lenses, used in the same outdoor camera applications as mega-pixel cameras, have f-stops of 1.4 or higher when adjusted for the widest field of view, and typically 2.8 or higher when adjusted for telephoto operation. For example, the Tamron ZC25 f-stop varies from 1.6 (wide angle) to 3.7 (telephoto), and the Sony IX45A f-stop ranges from 1.4 (wide angle) to 3.0 (telephoto). Varifocal lenses, also popular for security applications, allow the installer to manually set the field of view, with a minimum f-stop of 1.4.

It is possible to improve the optical quality of surveillance camera 52 by using fixed focal length lenses 54 with f-stops of about 0.7 and higher, but this requires a fixed field of view. Since the light sensitivity of a camera is inversely proportional to the square of the f number, a lens with an f-stop of 0.7 allows four times more light to reach the sensor than does an f-stop of 1.4, and 16 times more light than does an f-stop of 2.8. Therefore, when combined with a 0.7 f-stop lens, even the low cost MT9E001 could be used in a camera with nearly the same sensitivity as that of the Sony zoom lens camera when the lens is adjusted for the highest magnification. This could be adequate in many applications. These new lenses are also designed to be compatible with a mega-pixel imager designed for imaging fine detail, with much higher image resolution than that provided by a typical 0.4 mega pixel imager.

Since varifocal and zoom lenses cannot be practicably designed with less than a 1.0 f-stop, the 0.7 f-stop lenses are preferably available with a selection of view angles. For example, a mega-pixel camera 52 may use lenses 54 with varying view angles such as fields of view of 90 degrees, 60 degrees, 45 degrees, and 30 degrees. Any of these could be selected based upon the application. Surveillance of a parking lot may require a 90 degree lens, while looking down a long fence line or border crossing zone may need a 30 degree lens. The 8 mega-pixel imager enables about a 5× true digital zoom, so in many cases no additional mechanical zoom is needed.

Combining an 8 mega-pixel imager implemented with pixel averaging and a 0.7 f-stop fixed focal length lens further yields a factor of 4× light sensitivity improvement, making the camera more light sensitive than a traditional security camera when the imager is in its 2 mega-pixel mode. When finer detail is required, the camera can switch image resolution to 8 mega-pixel mode and still be roughly equal to the light sensitivity of a typical zoom lens or varifocal camera, when adjusted for maximum magnification. Thus, an 8 mega-pixel camera can be built using pixel averaging and a fixed focal length lens with light sensitivity that is higher than that of a typical model D1 resolution color security camera. Or a lower cost imager can be used to produce a camera that is about ⅓ as sensitive compared to a zoom lens camera with its widest field of view, but with equivalent sensitivity when the zoom lens camera is adjusted for maximum magnification.

Another benefit of using fixed focal length lenses is that a video analytics engine 58 can roughly calculate the location of an object based upon its size in the scene, as long as the field of view is known, which is determined by the focal length of the lens. For example, if a person appears to be 120 pixels tall in an image, where 2448 pixels represent 45 degrees, then the system can calculate that the person is roughly 5% of the 45 degrees, or about 2.25 degrees tall in the field of view from the position of the camera, which corresponds to 5 feet, 10 inches (1.8 meters). Assuming that the camera is mounted at about the height of a person's head, a 90 degree triangle describes the line from the camera to the top of the person's head and the top of the person's head to the ground. Trigonometry can be used to calculate the distance from the camera to the person as 148.5 feet (45.3 meters). The system disclosed can then display on-screen distance estimates whenever a person is detected.

Alternatively, if a site map has been installed in the system showing the camera location, it is also possible to roughly indicate on that map a person's location at the time of detection. The same can be done with vehicles, based on average distances between headlights and average sizes of most cars and trucks measured over a period of time. These distances would not be exact but could give an illustration on a map that would make it easier for security guards to track what is going on at the site. Moreover, a GPS locating tool can, upon installation, give the longitude and latitude of the camera location, which can then be displayed on an aerial map.

Sub-Sampling

Figure 7:
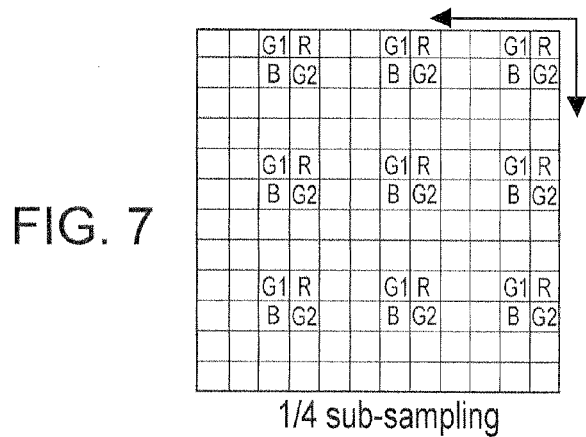
FIG. 7 is a diagram, supplied by Eastman Kodak Company of Rochester, N.Y., representing sub-sampling of an image by selecting a subset of pixel data.

Active video surveillance system 50 is implemented with programmable imager 56 having mega-pixel resolution. Imager 56 responds to customized control software comprising two-stage analytics engine 58 and, in a fraction of the duration of a single frame, acquires and provides a video stream of image data representing portions of an entire image. For instance, if video camera 52 allows for an image capture rate of 30 frames per second, in 10% of the duration of a single frame (10% of ⅟₃₀ of a second, or ⅟₃₀₀ of a second) resolution manager 80 provides to programmable imager 56 x- and y- coordinates of the pixels to be viewed from the whole scene, along with the degree of magnification desired. The operational control of resolution manager 80 allows imager 56 to toggle between sub-sampled view 72 of the whole scene and one or more magnified views 76 and 78. Sub-sampled view 72 displays a lower resolution image of the whole scene, the lower resolution image representing a subset or a combination of pixel data. Sub-sampling can be accomplished within programmable imager 56 in several different ways. One way is to group pixels and retain a representative subset of data from each group, regularly spaced throughout the image, as shown in FIG. 7. In the example, in which R, G, and B stand for red, green, and blue, respectively, a 2×2 block 174 of pixels in the upper right-hand corner is retained from each group 176 of 12 pixels. Another option is to simply sample one pixel out of a block of pixels, e.g., out of every block of 16 pixels the imager will choose and provide only one pixel for display. Single-pixel sampling is not the most accurate approach, and it waives the advantage of capturing the total amount of light gathered by all 16 pixels. The single-pixel sampling method is therefore less sensitive in low light situations; however, it still gives a fairly accurate representation of the whole image, but at ⅟₁₆ of the resolution, thereby retaining only ⅟₁₆ of the volume of data.

Figure 8:
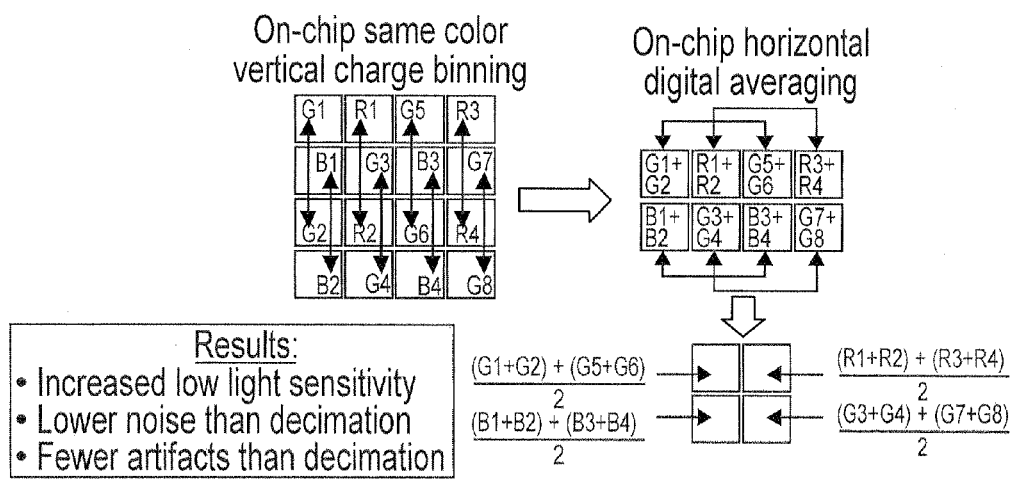
FIG. 8 is a diagram, supplied by Eastman Kodak Company, of a method of sub-sampling an image by averaging a block of pixel data.

A preferred embodiment uses a third approach 178, which entails averaging data from neighboring pixels and treating the average as one pixel, as shown in FIG. 8. If 16 pixels in a 4×4 pixel block 180 are averaged together, then the resolution of the image is ⅟₁₆th the total. Using this as an example, an 8 mega-pixel imager produces video data of the whole image with a resolution of about 0.5 mega-pixels, which is slightly larger than a standard NTSC model D1 full frame size. Neighboring pixels of the same color can be combined, first through charge binning 182 (G1+G2, G5+G6) and then by horizontal averaging 184, to produce a reduced resolution image with enhanced low-light sensitivity, lower noise, and fewer artifacts than those realized via image decimation.

Figure 9:
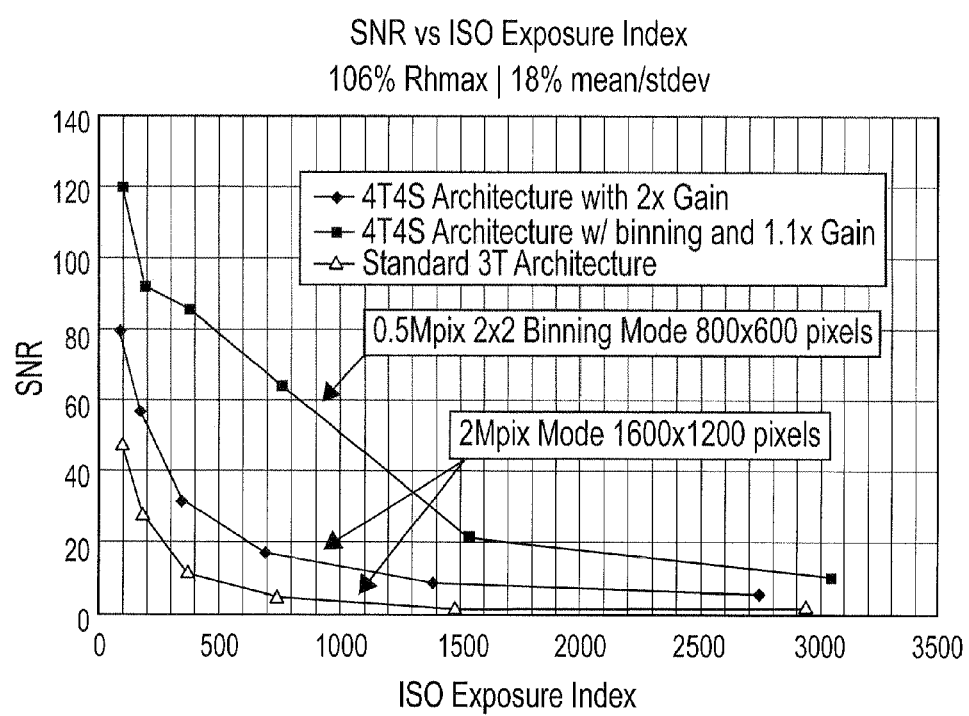
FIG. 9 is a graph, supplied by Eastman Kodak Company, relating signal-to-noise ratio to the ISO standard exposure index for different pixel designs.

As shown in FIG. 9, the averaging approach 178, called "4T4S", which stands for "four transistors, four shared," performs better in low-light conditions and has a much higher SNR. The 4T4S architecture, in which pixels in a pixel group share a common amplifier and common data capture transistors, offers increased SNR relative to a traditional 3T single-pixel transistor design. More significantly, the 4T4S design allows for the opportunity to sub-sample images by binning pixels within the pixel group for a still greater increase in SNR. The resulting sub-sampled video data are then analyzed using a simple, highly-sensitive first video analytics engine stage 90 that can detect potential objects or motion of interest requiring very few pixels on target.

The shared pixel approach of sub-sampling has several benefits. First, as illustrated above, it produces images with better SNR and better quality in low light situations, both of which are desirable for security applications. Second, a higher SNR reduces the number of false detections of objects caused by noise in the analytics engine. Third, since a much larger pixel area is used for gathering photons, a high quality image can be captured much faster. If images of an overall scene can be captured in 10%-20% of a normal frame period, there remains 80%-90% of the time for capturing magnified images of the windowed areas. Since the windowed areas may not be sub-sampled, it is better to allow for close-to-normal frame periods to generate better quality images in these areas. A faster capture rate also reduces the SNR through a reduction in signal strength. Fourth, the sub-sampled image of the overall scene is often video data that are needed for archival or live viewing purposes, when a high quality image is particularly valuable.

There are cases in which capturing high quality images at lower light levels and for magnified windows requires longer capture periods. Longer capture periods translate into longer frame periods, lowering the frame rate. This is desirable for high quality images in low light level scenes, especially for scenes without high velocity motion. For example, in the case of facial recognition, a human face may represent 20% of the area of an entire 8 mega-pixel image, but an actual resolution of only 0.4 mega-pixels may be all that is needed to accurately represent the face. A 4:1 ratio of sub-sampling would, therefore, be used in the face portion of the image. At the same time, a zoomed-in window may be displaying an iris of an individual's eye. This may take up only 2% of the area of the entire 8 mega-pixel image. In this case, the magnified image of the iris would not be sub-sampled at all but would display the full concentration of pixels at their highest resolution while showing only 2% of the whole image. Increasing the integration time by lowering the frame rate to improve image quality is made easier when a small portion of the image is being sampled.

Using efficient sub-sampling, even an 80 mega-pixel imager 56 may provide only small amounts of data, while still accessing all of the available resolution when needed. For example, a single image may be sub-sampled by a ratio of 80:1, yielding a video display resolution of 1 mega-pixel. The 1 mega-pixel image would be scanned by video analytics 58 to detect objects of interest. If there were, for example, four different areas where objects are detectable by video analytics 58, programmable imager 56 would, in response, zoom in and display magnified windows 74 of each of the four areas simultaneously, and each magnified portion would then be analyzed by a second stage of video analytics 100. If each window represented 0.25 mega-pixels, the total amount of video data being transmitted by the mega-pixel imager is just 1 mega-pixel, all of which can be displayed at 30 frames per second with current technology.

Furthermore, a "super resolution" video playback can be created using temporal frame filling to make 10 frames per second appear as though there are 30 frames per second. Instead of repeatedly imaging static background areas of a scene, the unchanging parts are temporally interpolated to fill in frames that are sampled at a higher rate in the dynamic areas. The result is video data that contain the equivalent of an 8 mega-pixel image, because zooming can be performed on areas where important action is taking place and areas of unchanging background are integrated over time and by the other techniques mentioned above. This provides significant savings in storage and transmission bandwidth, at the expense of more processing to reconstruct the video data for playback.

Analytics

The process of determining where accuracy is needed in a scene can be established manually by an installer who configures a video surveillance system in advance, or it can occur automatically as a result of a sophisticated video analytics capability continuously recognizing where important activity is taking place in real time. The automatic process can be set up to dynamically adjust based upon the activity present, or it can designate windows of higher resolution that are consistently captured, irrespective of whether activity is present.

Analyzing sub-sampled images to automatically decide which portions of a scene are of interest is carried out by two-stage video analytics engine 58. In a preferred embodiment, imager 56 acquires a first series of sub-sampled video data that correspond to a first field of view of the scene representing either substantially the full field of view of the scene at a resolution that is less than the characteristic maximum image resolution of imager 56 or a portion of the full field of view of the scene. The portion of the full field of view of the scene can be at a resolution that is substantially equal to or is less than the characteristic maximum image resolution of imager 56. First analytics engine stage 90 analyzes the sub-sampled video data in the first series to identify moving objects with low pixel resolution. Typically, as few as four pixels, moving as a group, would be recognized as a moving object. As a general rule, the smaller the pixel count required to detect the object, the better the video analytics can detect small objects, but the more false triggers it creates. For this reason, when small pixel count objects are detected, some movement tracking is usually performed to help filter out noise. Even a small pixel count that is moving consistently is a good indicator of an object of interest. When the object size has a higher pixel count, less filtering is performed through tracking, because video analytics engine 58 performs filtering with more accurate recognition of the shape and movement patterns of the object. First analytics engine stage 90 avoids, however, triggering detection in response to a single pixel changing state to prevent an unmanageable number of detections.

Analysis of the sub-sampled video data in the first series can be performed by first analytics engine stage 90 to control imager 56 to change the position coordinates of the windowed view in the first field of view of the scene to track motion of the moving object or objects identified. Motion tracking can be performed using different range resolutions of the windowed view. Analysis of sub-sampled video data in the second series can be performed by second analytics engine stage 100 to recognize one or more objects in a detected region of interest in the scene and to control imager 56 to change the position coordinates of the windowed field of view to track the motion of each of the recognized objects through the first field of view of the scene. The windowed view is of a size that covers all of the objects recognized.

Moreover, the analysis of sub-sampled video data in the second series can be performed by second analytics engine stage 100 to recognize a characteristic in the region of interest and, upon verification of the characteristic, control imager 56 to acquire a continual stream of second series of sub-sampled video data representing successive observations of the windowed view of the detected region of interest to closely observe for a time the recognized characteristic.

When first video analytics engine stage 90 reviews a scene in a sub-sampled view, the process of determining which regions require a more detailed view with further analysis is called speculative processing. Thus, first analytics engine stage 90 entails speculating on regions that include objects or activities of interest. It is also possible to speculatively allocate resolution by predicting where interesting activities may occur. For example, given the predicted trajectory of a vehicle, resolution and processing for future frames of video data can be appropriately allocated, enabling efficient use of the computational budget available in power-conscious embedded systems.

When very high resolution images contain a great degree of detail, speculative processing on a severely sub-sampled image may fail to detect objects or activity of interest. For example, in the case of an 8 mega-pixel imager using a 16:1 sub-sample ratio 92, it is possible that objects may be too far away for first analytics engine stage 90 to detect them. In a sub-sampled view, objects may occupy only one or two pixels, which may not provide sufficient indication that they represent an object of interest. In the extreme case of an 80 mega-pixel imager, a sub-sampled view of an entire scene contained in a 0.5 mega-pixel image represents a sub-sample ratio of 160:1. Consequently, objects of 50 to 100 pixels in the fully magnified view may be completely lost when sub-sampled at such a low rate.

Therefore, for speculative processing to capture important activity or objects, there is a limit to the degree of sub-sampling allowed. A ratio of 16:1 is recommended as the maximum sub-sample ratio based on current methods used in video analytics. In some cases, first analytics engine stage 90 may generate too many false detections, thus requiring a smaller sub-sampling ratio. Otherwise, objects and activities of interest could be missed. In the case of very high resolution imagers, the regions of interest are narrowed to perform the first stage of analytics. If this is not done, the volume of image data becomes unmanageable, both in terms of cost (imager chip is expensive) and performance (speed of data processing slows at high volume).

The case of a 360 degree digital dome camera 52 illustrates limitations of speculative processing. An 80 mega-pixel imager 56 is used with 360 degree mirror optics to create an all-solid state dome camera with a 360 degree field of view at the horizon. The dome camera is downward-looking so that it sees the ground below, but not the sky above it, as shown in FIG. 3, in which window 70 represents the 360 (panoramic) field of view 72. The bottom two windows 74 on the lower right and lower left, simultaneously display magnified views 76 and 78, in this case, taken from a separate pan-tilt-zoom camera. (In the case of system 50, however, all three images could be obtained from a fully solid state 80 mega-pixel camera 52 using 360 degree optics.)

Some portions of a scene may contain images of very small objects located far away, while other portions do not. For example, close-up objects on the ground, as in magnified views 76 and 78, can easily be analyzed in a sub-sampled closer range view that produces a 1 mega-pixel image. However, near the horizon, a much more detailed view of scene 72 is used if one does not want to miss important activity or objects.

Monitoring through the first stage of analytics entails selection of regions of interest where there is a closer range view. With reference to FIG. 3, the region of interest would be restricted to a narrow band below the horizon, representing only 10%-20% of the whole scene, thereby reducing the volume of pixel data to approximately 8 to 16 mega-pixels. Furthermore, the new video representation occupies 20% or less bandwidth to transmit and 20% or less storage space to record, yet it retains all the details needed to zoom into the areas where critical resolution is needed. This portion of the scene may be limited to a 4:1 or 8:1 sub-sampling ratio to ensure that first analytics engine stage 90 will not miss anything important. The rest of the image may be analyzed at a sub-sampling ratio of 40:1 or 80:1, reducing the pixel data volume to a manageable level of approximately 2 mega-pixels.

Accurately selecting the correct region of interest to focus on is of major importance in the windowing process. Often there exist some regions of great interest, and other regions of little or no interest. For example, roadways may be important to monitor for traffic, while the sky above the horizon may be completely irrelevant (except, perhaps, for approaching aircraft). In fact, entire regions of a scene may simply fall outside the area of concern.

There are two ways of selecting the correct regions of interest. One way is to manually pre-select regions 98 requiring monitoring, in which case system 50 determines whether an object is of interest according to criteria previously defined by a user during system set-up, or according to pre-assigned stored default settings. For instance, a user may pre-select a portion of a scene where intruders could be seen entering or leaving, such as a building entrance or exit. The user may also designate in advance different portions of the same scene that are of no interest and should be ignored. In a scene that looks out at a harbor, the user may wish to ignore pedestrians walking along a boardwalk next to the water but may wish to detect and focus on approaching boats, ships, or other watercraft in the harbor. The user also specifies the level of magnification required for first video analytics engine stage 90. To do this, the installer calibrates system 50 by indicating an approximate size of a window that would embrace the objects of interest, such as vehicles or people, in various portions of the scene.

A preferred approach is to automate the selection process by integrating video analytics engine 58 that can recognize objects and activity over time and optimize sub-sample ratios to capture critical activity. The automated approach is more reliable and requires no manual set-up. Ideally, spatial and temporal resolution are automatically allocated in response to apportioning the size or resolution of a window and to assessing the location and speed of an object. Some video analytics processors can determine the locations of moving objects by observing their positions relative to the horizon. For example, in the case of the harbor scene, water near the horizon is farthest away. Therefore, objects detected there trigger magnified windows, or higher spatial resolution, for a closer range view, compared with objects located in the foreground near the boardwalk, which require more pixels on target before a magnified closer range view is warranted. On the other hand, objects near the horizon appear to be moving slower, so they can be sampled at a slower rate, i.e. with less temporal resolution, than objects in the foreground that appear to be moving faster. Thus, depending on the location and speed of the object detected within the large scene, the magnified portion of the scene will be appropriately sub-sampled to display the degree of spatio-temporal resolution needed. If an object far off on the horizon is of interest, for example, full resolution of the magnified image will be displayed and sent to second video analytics engine stage 100. Algorithms like this help reduce the number of unnecessary windows displayed for second stage analysis.

Figure 10A:
FIG. 10A is a photograph of an outdoor scene of a bird perched on a birdfeeder, illustrating the resolution allocation scheme described in the present disclosure.
Figure 10B:
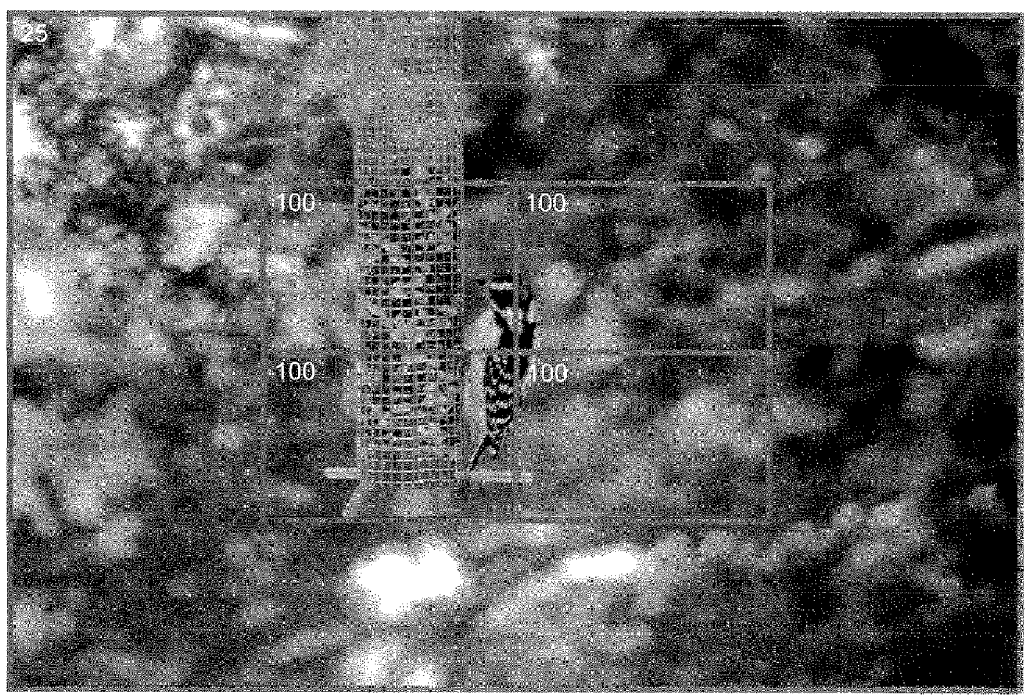
FIG. 10B is the photograph of FIG. 10A, on which are superimposed D1 resolution (720×480 pixels) tile decomposition boxes reflecting a spatial resolution allocation.
Figure 10C:
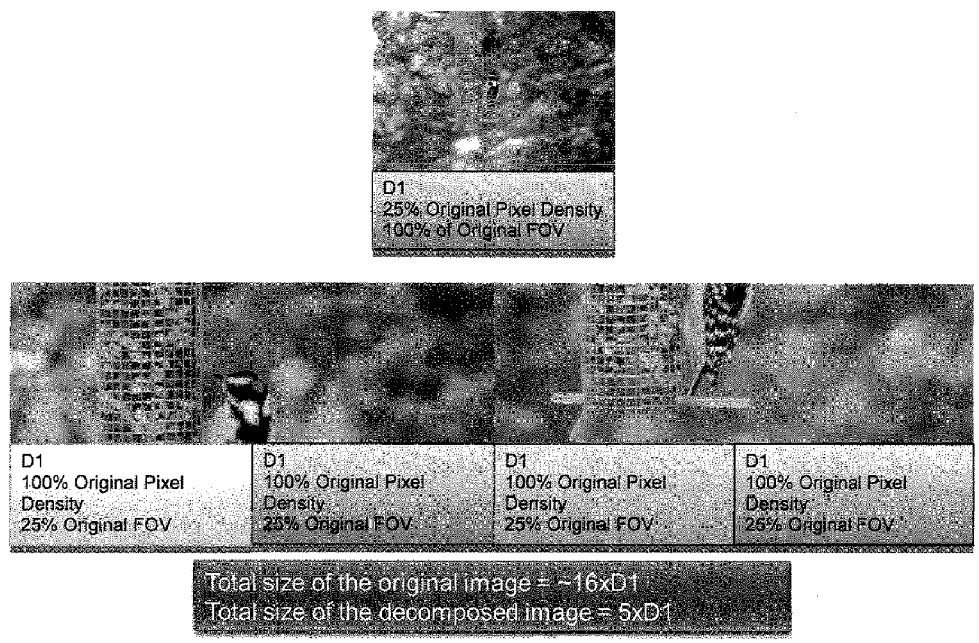
FIG. 10C is a segmented image of the photograph of FIG. 10A, annotated with information summarizing the relative values of pixel density and field of view resulting from the D1 tile decomposition of FIG. 10B.

A detailed example of the resolution allocation scheme using D1 tile decomposition is illustrated in FIGS. 10A, 10B, and 10C, showing an outside scene of a bird perched on a birdfeeder. The bird and the lower part of the feeder adjacent to the bird appear to be the most important features of the image, compared with a background scene of foliage that moves in response to wind conditions and fills the remainder of the scene. The area of interest is then captured with the characteristic maximum image resolution, or 100% pixel density, of imager 56, while the background scene receives only 25% pixel density, in which pixel density is in inverse proportion to field of view (FOV). FIG. 10B shows five areas selected for a D1 tile decomposition, which include the overall scene and four close-up images of the bird perched on the birdfeeder. FIG. 10C shows the resulting D1 decomposition of the original image onto the five selected areas. The first is an image of the overall scene at 25% resolution, and the other four images are high resolution portions of the area of interest surrounding the bird. The decomposed data occupy less than one third ($5/16$) of the memory storage space that the original image at 100% pixel density would have occupied. Decomposition of the same bird picture using a Common Interface Format (CIF) technique reduces the memory storage requirement to approximately 10% ($5/64$) of the original image, by zeroing in even further on the bird and excluding the upper portion of the birdfeeder. CIF decomposition selects six areas, five of which each represent only 6.25% of the original field of view.

Figure 11A:
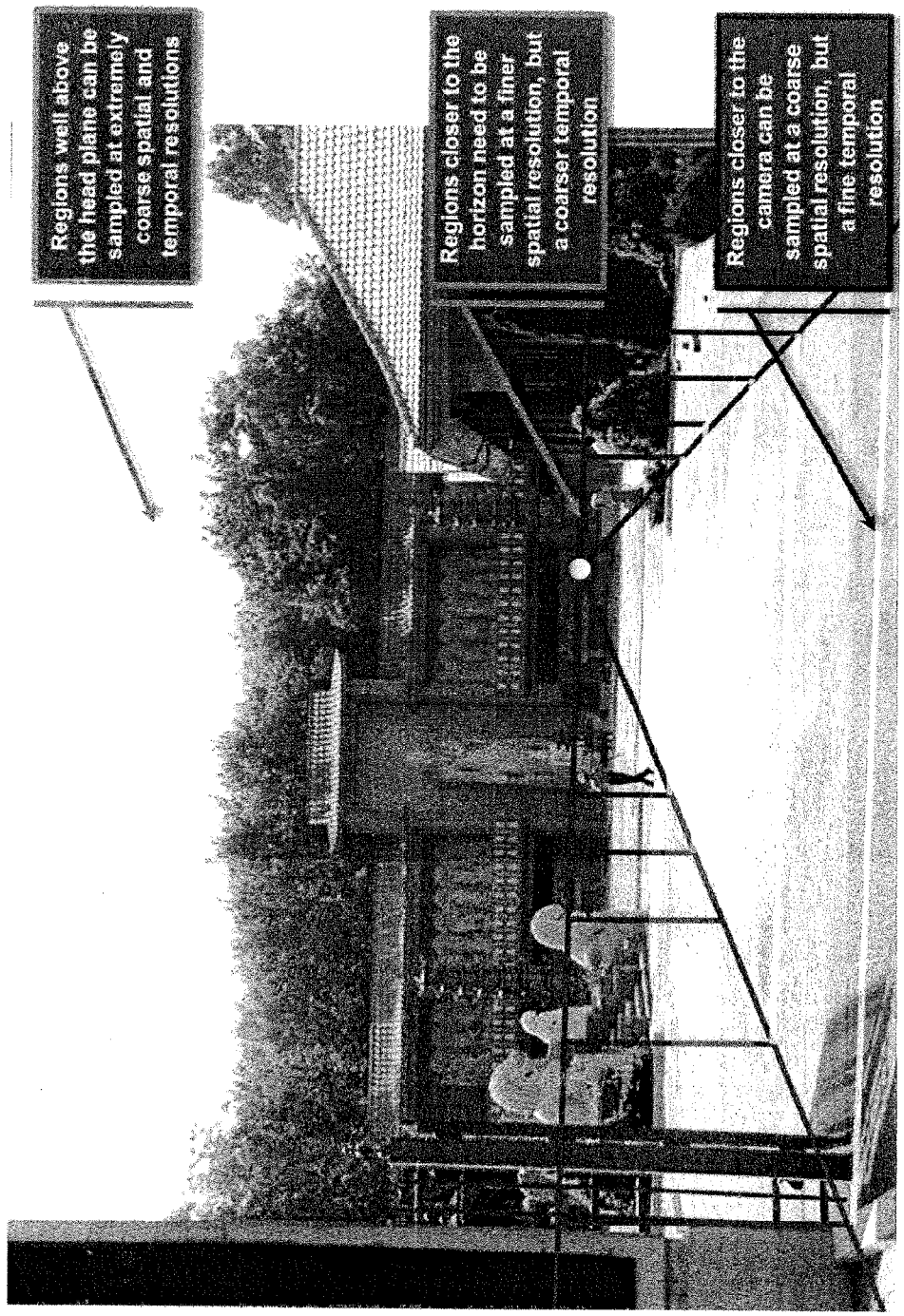
FIG. 11A is a photograph of an outdoor courtyard scene of a landmark building, illustrating the resolution allocation scheme described in the present disclosure.
Figure 11B:
FIG. 11B is the photograph of FIG. 11A, on which are superimposed Common Interface Format (CIF) tile decomposition boxes reflecting a spatial resolution allocation.
Figure 11C:
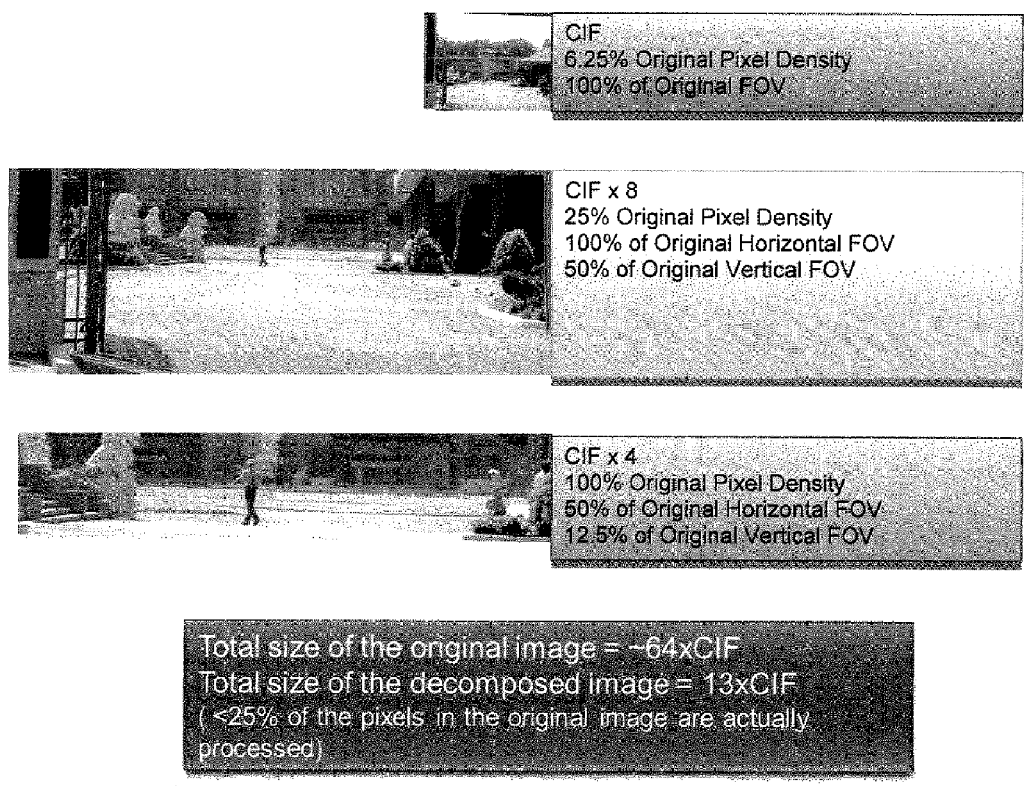
FIG. 11C is a segmented image of the photograph of FIG. 11A, annotated with information summarizing the relative values of pixel density and field of view resulting from the CIF tile decomposition of FIG. 11B.

A detailed example of the resolution allocation scheme using CIF tile decomposition is illustrated in FIGS. 11A, 11B, and 11C, showing an outdoor courtyard scene of a landmark building, with a plaza in the foreground and pedestrians moving in the plaza. The scene in FIG. 11A can be divided into three sections: the sky, which is above the building and not of particular interest; a relatively intricate immediate area surrounding the building and located at the horizon far from the camera; and the foreground, which is not spatially complex but could have pedestrians moving rapidly through it at any time. Appropriate resolution allocation entails fine temporal resolution to capture motion in the foreground plaza, fine spatial resolution to capture details around the building at the horizon, and coarse spatial and temporal resolution otherwise. FIG. 11B demonstrates how the decomposition is structured according to the above criteria. FIG. 11C then specifies the final size and pixel density of the decomposed image. If multiple resolution streams are used, they are encoded separately.

A significant difference between existing video analytics and the video analytics disclosed is that the resulting video stream described herein may be played back as though it were a full resolution video stream. When the video is replayed, the decomposed image is recomposed with the available resolution streams. No video screens can currently display an 8 mega-pixel video stream, so it would at first look like a D1 or 1 mega-pixel video. Zooming in, which is necessary to see detail, may be performed in any area where critical data have been captured in higher resolution. For instance, a user may zoom in on a car and then zoom in further on its license plate. In areas lacking critical data, either high resolution pixel data are discarded, such as in passing clouds in the sky, or the detail, if needed, may be assembled over a longer time. In most cases a high level of detail is unnecessary, except where pertinent motion is detected. However, buildings and other stationary objects may be captured in high resolution by integrating lower resolution images over many frames to capture greater detail. Traditional image smoothing and anti-aliasing algorithms can be used on the recomposed image as a further enhancement.

In other cases, large portions of a whole scene may be exhibiting activity. For example, in the case of the harbor scene, it is possible that 30% of the scene is filled by the boardwalk area where people are regularly walking by. This portion of the image, when magnified enough to perform accurate second stage analytics, will still require a resolution of only 0.4 mega-pixels, which is the current standard resolution of a security surveillance camera. This still leaves plenty of the resolution budget to zoom in on multiple watercraft detected in the harbor.

Although first analytics engine stage 90 can automatically calibrate sub-sample ratios in areas where activity is expected, monitoring for unusual activity, such as an intruder, is also desirable. Automatic selection of sub-sampling ratios 92 for these regions can be approached in two ways. First, video analytics engine stage 90 can detect motion, such as pedestrians or vehicles passing through a designated region and calibrate that region. Alternatively, the installer can "borrow" set-up ratios from another region that has already been calibrated. For example, if one hill area normally has no activity and is roughly the same distance away as a roadway that has been calibrated, set-up conditions for the roadway can be copied and applied to the hill area. Once this camera calibration has taken place, the embodiments described herein can take advantage of this information to determine when to zoom in for second stage video analysis.

In areas of an image where potential objects or motion of interest are detected, resolution manger 80 generates a series of x-y coordinates to encompass all regions requiring higher resolution. All of these regions of interest are, in preferred embodiments, represented by signals corresponding to analysis output data provided at the output of programmable imager 56 during the same capture period, between alternating frames of the overall sub-sampled scene. These selected regions of interest may still be sub-sampled, although at a lower ratio than the overall scene. More specifically, second analytics engine stage 100 analyzes the sub-sampled video data in the second series of sub-sampled video data to recognize a characteristic of a region of interest. Such a characteristic could include objects detected in the region, activity in the region, elements in a person's eye, and fiducial points on a person's face. In the case of recognition of objects, the analysis of the sub-sampled video data in the first series is preferably performed at a lower image resolution to detect the region of interest, and the analysis of the sub-sampled video data in the second series is performed at a higher image resolution to more accurately recognize the object present in the region of interest. The image resolution of the second series of sub-sampled video data can be determined by recognition of the size of the object over time for the video image data produced by video camera 52. (If first analytics engine stage 90 analyzes the sub-sampled video data in the first series to recognize the size of an object detected in the region, the image resolution of the second series of sub-sampled video data can also be determined over time for the video image data produced.)

For example, if large objects or large areas of motion were selected, they may require a sub-sample of 2:1 or 4:1. All of the pixel data from these regions of interest would then preferably be sent to second analytics engine stage 100, where more accurate analysis would be performed on higher resolution data. In a preferred embodiment, second analytics engine stage 100 has much higher recognition capability and requires more pixels on target to do its recognition. For example, whereas the first stage of video analytics processing may detect an apparent object that occupies 4 or 5 pixels in a scene, a magnified window uses 50 or 60 pixels to display the same object. Second video analytics engine stage 100 recognizes this object as a vehicle, a human, a boat, or some other, perhaps unknown, object.

As explained previously, this second analytics engine stage 100 is not necessary, but is preferred, and could be followed by other, even higher resolution stages of analysis. More specifically, resolution manager 80, by way of control path 82, controls imager 56 to acquire a third series of sub-sampled video data corresponding to the scene. The sub-sampled video data in the third series represents a recognized characteristic in a magnified localized portion of the windowed view of the region of interest. For example, if video analytics engine 58 detected letters, numbers, or other identifying characters, or if images of an iris or other facial characteristics were needed in more detail, new x-y coordinates are selected requiring even lower ratios of sub-sampling to capture finer details. More detailed windows are preferably all captured during a third interleaving period within the normal frame period. Examples of second-stage video analytics include facial recognition, biometrics matching, detection of activity, and detection and recognition of moving objects.

After an object is detected by second video analytics engine stage 100, in some applications all that is desired is to zoom in on the object, capture a magnified image, and store it along with other analysis output data for future use. Once a magnified window displays an object and area of interest, analysis output data describing these subjects is automatically captured. For example, if a car pulls into a parking lot, it may be desirable to zoom in on the license plate and then perform license plate recognition on the characters. The license plate number may be stored in database 104 with the video data so that it is searchable later, or so that the analysis output data can be compared against another database of wanted or stolen vehicles. After capturing the license information, camera 52 may not need to zoom in on the license plate again, but the user may wish to zoom in on the faces of the people getting out of the car and store this information. Later, when people approach the same car, fiducial points on their faces are compared with fiducial points on the faces of the people who originally left the car to determine whether they match. In response, alarm 102 may be sent to a user, or the video data may simply be stored and logged in database 104, depending on user-specified instructions residing in system 50. If the magnified window displays an image devoid of objects of interest, then the video data are not captured or stored, and therefore trigger no further response.

Video camera 52 produces video image data in response to light propagating from the scene such that the first and second series of sub-sampled video data correspond to images of, respectively, the first and second fields of view of the scene. The sub-sampled video data in the first and second series can be delivered from imager 56 as interleaved images of, respectively, the first and second fields of view of the scene. The images corresponding to the first and second fields of view can have different image resolutions and be transmitted through communication network 66 to a destination, such as information storage database 104, either in combination as a single video stream or separately as two video streams representing the first and second fields of view at the different image resolutions.

Figure 12:
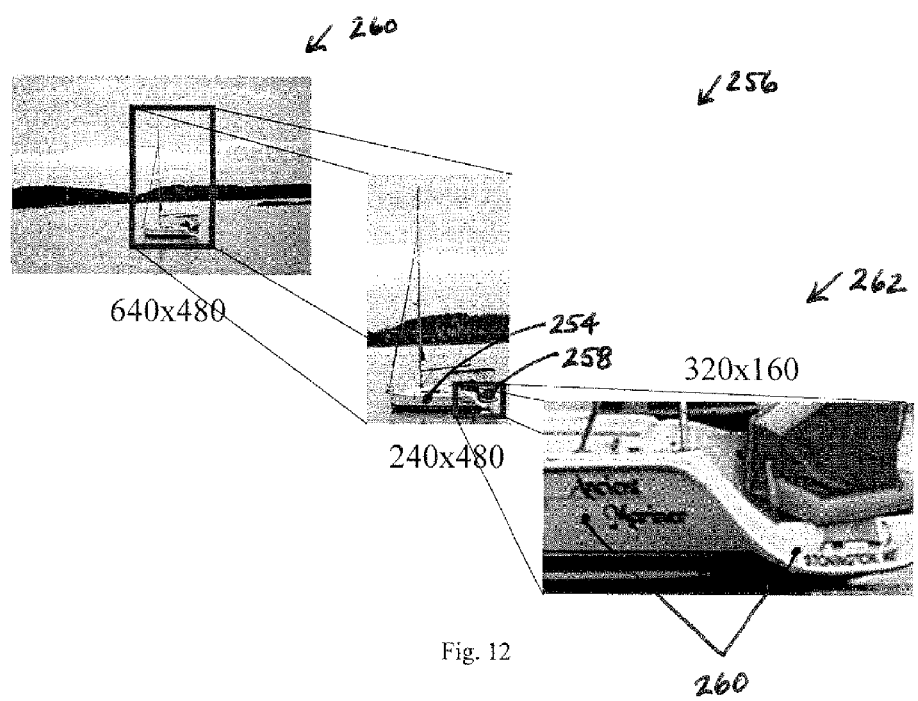
FIG. 12 is a series of images illustrating automatic windowing of and zooming in on a region of a scene under observation.

The summary capability of active video surveillance system 50 is demonstrated in FIG. 12, in which the subject of interest is a boat anchored in a body of water. A 6 mega-pixel camera outfitted with a fixed focal length 0.7 f-stop lens 54 captures and displays a high-quality image of the overall scene. With reference to the first frame, a 640×480 standard VGA sub-sampled image 260 is sufficient to establish the presence of a boat 254. In response to user inputs specifying boats as interesting subject matter in this scene, an examination of boat 254 contained in a scene region 256 is initiated by first video analytics engine stage 90. Non-destructive readout is used to increase the dynamic range of the image so that light reflecting off the water does not obscure visual details of boat 254. Focusing on localized region 258, the analysis indicates that there is potentially some text 260 on the exterior of one side of boat 254 and engages digital zoom to magnify this area. The resulting cropped 240×480 image is analyzed by second video analytics engine stage 100 to reveal readable text 260 on the side of the boat. The final magnified image 262 is one-sixth of a VGA image. Adding images 260 and 262 totals 0.35 mega-pixels; therefore, all of the critical information can be easily stored in database 104 for later retrieval or further analyzed automatically with character recognition software.

It will be obvious to those having skill in the art that many changes may be made to the details of the above-described embodiments without departing from the underlying principles of the invention. The scope of the present invention should, therefore, be determined only by the following claims.

The invention claimed is:

1. A method of dynamically controlling an imager of a video camera to provide, with selectable resolution, image information relating to one or more regions of interest in a scene processed by the video camera, the imager having a specified maximum number of image pixels that establish a characteristic maximum image resolution of the imager and having a number of image pixels from which are produced video data that represent the scene, comprising:

controlling the imager to acquire high resolution video data representing substantially the specified maximum number of image pixels that capture a full field of view of the scene controlling the imager to acquire a first series of sub-sampled video data from the high resolution video data corresponding to the scene at a first image resolution, the first series of sub-sampled video data produced by a first subset of image pixels composed of fewer image pixels than the specified maximum number of image pixels of the imager;

analyzing the sub-sampled video data in the first series to detect a region of interest within the scene; and controlling the imager to acquire a second series of sub-sampled video data from the high resolution video data corresponding to the detected region of interest within the scene at a second image resolution thereby non-uniformly sub-sampling at least one frame of the video data, the second image resolution being higher than the first image resolution, the sub-sampled video data in the second series representing a windowed view of the detected region of interest in the scene.

2. The method of claim 1, in which the imager using the specified maximum number of image pixels captures a full field of view of the scene at the characteristic maximum image resolution, and in which the first series of sub-sampled video data represents a portion of the full field of view of the scene.

3. The method of claim 1, in which the sub-sampled video data in the second series representing a windowed view of the detected region of interest includes a magnified view portion as compared to the scene to which the sub-sampled video data of the first series corresponds.

4. The method of claim 1, further comprising analyzing the subsampled video data in the second series of sub-sampled video data to recognize a characteristic of the region of interest.

5. The method of claim 4, in which:

the characteristic of the region of interest is a presence of an object in the region of interest;

the first and second image resolutions represent respective lower and higher image resolutions;

the analysis of the sub-sampled video data in the first series is performed at the lower image resolution to detect the region of interest; and the analysis of the sub-sampled video data in the second series is performed at the higher image resolution to more accurately recognize the object present in the region of interest.

6. The method of claim 4, further comprising controlling the imager to acquire a third series of sub-sampled video data from the high resolution video data corresponding to the scene, the sub-sampled video data in the third series representing the recognized characteristic in a magnified localized portion of the windowed view of the detected region of interest.

7. The method of claim 4, in which:
the recognized characteristic includes an object located in the region of interest, the object having a size;
the video camera produces video image data in response to light propagating from a scene; and
the second image resolution of the second series of sub-sampled video data is determined by recognition of the size of the object over time for the video image data produced by the imager.

8. The method of claim 1, in which the video camera produces video image data in response to light propagating from a scene, and further comprising:
analyzing the sub-sampled video data in the first series of sub-sampled video data to recognize an object in the region of interest, the object having a size; and
determining from the size of the object the second image resolution of the second series of sub-sampled video data for the video image data produced.

9. The method of claim 1, in which the region of interest is manually selected.

10. The method of claim 1, further comprising:
analyzing the sub-sampled video data in the second series of sub-sampled video data to recognize a characteristic of the region of interest; and
upon verification of the characteristic of the region of interest after the analysis of the subsampled video data, controlling the imager to acquire a continual stream of the second series of sub-sampled video data representing successive observations of the windowed view of the detected region of interest to closely observe for a time the recognized characteristic.

11. The method of claim 1, in which the windowed view has position coordinates representing its location in the scene, and further comprising:
analyzing the sub-sampled video data in the first series of sub-sampled video data to identify an object in the region of interest; and
controlling the imager to change the position coordinates of the windowed view to track motion of the object through the scene.

12. The method of claim 11, further comprising changing to different values the second image resolution of the windowed view as the motion of the object is tracked through the scene.

13. The method of claim 1, in which the windowed view has position coordinates representing its location in the scene, and further comprising:
analyzing the sub-sampled video data in the second series of sub-sampled video data to recognize a number of objects in the region of interest; and
controlling the imager to change the position coordinates of the windowed view to track motion of each of the number of objects through the scene.

14. The method of claim 13, in which the number of objects is greater than one and the windowed view is of a size that covers all of the number of objects recognized.

15. The method of claim 1, further comprising:
delivering from the imager the sub-sampled video data in the first and second series as interleaved images of the scene and the windowed view of the detected region of interest, respectively.

16. The method of claim 1, further comprising:
transmitting through a communication medium for delivery to a destination the first and second series of sub-sampled video data in combination as a video stream representing the scene and the windowed view of the detected region of interest in the scene at the different image resolutions.

17. The method of claim 1, further comprising:
transmitting through a communication medium for delivery to a destination the first and second series of sub-sampled video data as, respectively, a first video stream representing a first windowed view of the scene and a second video stream representing a second windowed view as the detected region of interest in the scene.

18. The method of claim 1, further comprising:
analyzing the sub-sampled video data in the first series of sub-sampled video data to recognize a characteristic of the region of interest; and
controlling the imager to acquire at a frame rate one of the first and second series of sub-sampled video data corresponding to the scene, the frame rate being set in response to the characteristic recognized by the analysis of the sub-sampled video data in the first series.

19. The method of claim 18, in which the recognized characteristic includes an object located in an area of the region of interest, in which the object and the area are characterized by brightness levels, and in which the frame rate is set to provide a frame integration time that is adequate to provide a brightness level contrast between the object and the area to render them visually distinguishable from each other.

20. The method of claim 18, in which the frame rate constitutes a first frame rate and in which the controlling the imager acquires the first series of sub-sampled video data at the first frame rate, and further comprising controlling the imager to acquire at a second frame rate the second series of sub-sampled video data.

21. An automated active video surveillance system, comprising:
a high image data capacity video camera operable to provide image information relating to a scene processed by the video camera, the camera including a high resolution imager that has a number of image pixels from which are produced image data representing a scene processed by the video camera;
a video analytics engine implemented to analyze data included in the image data produced by the imager;
an imager controller operatively associated with the imager and the video analytics engine to acquire high resolution video data representing substantially all of the number of image pixels that capture a full field of view of the scene and to provide multiple portions of the image data for analysis by the video analytics engine to detect regions of interest at different locations in the scene, the multiple portions including a first series of sub-sampled image data from the high resolution video data and a second series of sub-sampled image data from the high resolution video data, the first series of sub-sampled image data corresponding to the scene at a first image resolution for analysis by the video analytics engine to detect a first region of interest within the scene, the second series of sub-sampled image data representing a windowed view of the detected first region of interest within the scene at a second resolution that is higher than the first image resolution; and a communications medium receiving and transmitting to a destination separate from the camera analysis output data provided by the video analytics engine upon analyzing the first and second series of sub-sampled image data, wherein the first and second series of sub-sampled image data are formed by non-uniformly sub-sampling at least one frame of the image data.

22. The system of claim 21, in which the imager controller in response to the video analytics engine allocates resolution so that at least some of the multiple portions are analyzed with different image resolutions, thereby enabling smaller objects within the scene to be imaged at higher resolution to undergo appropriate scrutiny and larger objects within the scene to be imaged at lower resolution.

23. The system of claim 21, in which the multiple portions of the image data are provided substantially simultaneously for analysis.

24. The system of claim 21, further comprising an image display operatively connected to the communications medium to display as visual images data corresponding to the analysis output data.

25. The system of claim 21, further comprising an image display operatively connected to the communications medium, and in which data corresponding to the analysis output data represent a closer range view of a feature of the scene and a farther range view of a region of the scene, and in which the image display is operable to display simultaneously images of the closer range view and the farther range view.

26. The system of claim 21, further comprising a storage medium operatively connected to the communications medium to store the data corresponding to the analysis output data.

27. The system of claim 21, in which the video camera is attached to a motorized pan mechanism, and in which the motorized pan mechanism is driven by stepper motors controlled by the video analytics engine to move the camera in response to analysis by the video analytics engine detecting activity in at least one of the regions of interest.

28. The system of claim 21, in which the video camera includes a high image resolution lens.

29. The system of claim 28, in which the analysis of data performed by the video analytics engine includes adjustment of light exposure levels associated with the high image resolution lens to optimize recognition of an object of interest within the scene, the adjustment of light exposure levels excluding from the analysis output data portions corresponding to high contrast areas of the scene.

30. The system of claim 28, in which the high image resolution lens is of fixed focal length and an f-stop of 1.0 or smaller.

31. The method of claim 1, in which the scene processed by the video camera changes over time; and further comprising controlling the imager to acquire multiple time-displaced sets of the first series of subsampled video data and the second series of subsampled video data, in which the acquiring of the second series of sub-sampled video data of one of the multiple sets is followed by the acquiring of the first series of sub-sampled video data of a subsequent one of the multiple sets, thereby to enable continual detection of the region of interest and the windowed view of the detected region of interest.

* * * * *